UNITED STATES PATENT OFFICE.

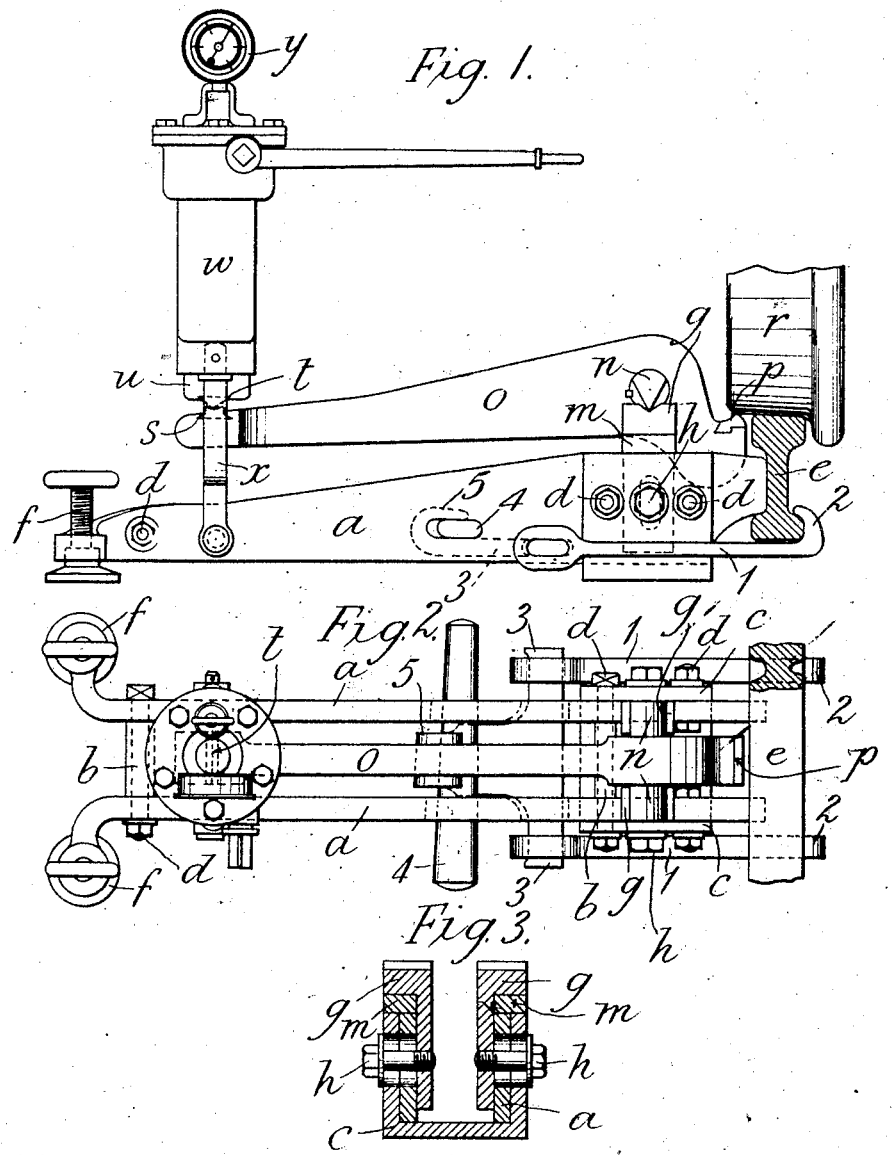

STEPHEN WEST GROOME, OF WORTLEY, ENGLAND.

WEIGHING-MACHINE.

1,012,632.   Specification of Letters Patent.   Patented Dec. 26, 1911.

Application filed June 30, 1911. Serial No. 636,238.

*To all whom it may concern:*

Be it known that I, STEPHEN WEST GROOME, a subject of the King of Great Britain and Ireland, residing at Wortley, Leeds, in the county of Yorkshire, England, have invented Improvements in Weighing-Machines, of which the following is a specification.

The object of this invention is to provide a new or improved portable weighing machine for ascertaining the weight on the axles of locomotives and the like.

The apparatus is of the type in which a lever fulcrumed on a frame or support is adapted to bear under the tire of a wheel and lift the wheel off the rail.

According to this invention the weighing machine or appliance comprises a frame or support, a lever fulcrumed on said support, a lifting jack connected to said support and adapted to bear on one end of said lever, and a pressure indicator connected to said jack.

The frame or support can be made of any suitable shape or design and is provided with bearings arranged in a convenient position for the lever. One end of the frame or support is adapted to bear against the rail on which a locomotive or the like is standing, and a suitable clip or clips is or are provided for keeping the frame or support in proper position relatively to such rail. The other end of the frame or support is connected with the lifting jack. This end of the frame or support is also furnished with adjustable foot screws for the purpose of adjusting the level of the frame or support.

A suitable weighing lever is mounted on the bearings in the frame or support, one end of the lever being suitably formed to engage with some part of the wheel of a locomotive or the like, preferably with the bottom portion of the wheel tire that projects beyond the rail head. The other end of the lever is adapted to be engaged by the lifting jack, or pressure cylinder.

In connection with the lifting jack is an indicator which in the case of a hydraulic jack may consist of a small piston working in a cylinder in communication with the pressure side of the jack ram, the piston being controlled by a spring or springs and arranged to impart motion to a pointer moving over a properly graduated dial. Any other suitable indicator may be used such as a Bourdon tube pressure gage for example. When the lifting jack is required for ordinary purposes the indicator can be unscrewed and a plug inserted in its place.

Figures 1 and 2 of the accompanying illustrative drawings show in side elevation and plan respectively a weighing machine or appliance according to this invention. Fig. 3 is a detail view.

In the construction shown the frame or support, is constituted by two members $a$ arranged side by side and held the desired distance apart by distance pieces $b$ and a channel shaped holder $c$; bolts $d$ securing the members together and to the holder. At one end the members $a$ are adapted to abut against the rail $e$ of a railway and rest upon the lower head or flange of such rail as shown. At the other end the members $a$ are each bent outwardly and fitted with a screw foot $f$ by manipulation of which the level of the frame or support can be adjusted.

Fulcrum blocks $g$, Fig. 3, are adjustably secured to the frame or support by set screws $h$ that pass through slots formed therefor in the holder $c$ and members $a$, the weight on the fulcrum blocks being taken by the frame or support through packing pieces $m$ inserted between the outwardly extending upper end of each fulcrum block and the corresponding member $a$ and side of the holder $c$. Working in the fulcrum blocks $g$ is a knife edge bearing $n$ fixed in a weighing lever $o$ that extends parallel to the members $a$ and one end of which is fitted with a knife edge or nose $p$ of tool steel adapted to bear on that portion of the bottom of a wheel tire $r$ that projects outwardly beyond the rail $e$. The other end of the lever $o$ is fitted with a bearing block $s$ adapted to be engaged by a knife edge $t$ mounted on the outer end of the ram $u$ of a hydraulic jack the cylinder $w$ of which is connected to the members $a$ of the frame or support by pivoted tension rods $x$. The upper end of the cylinder $w$ is furnished with a gage $y$ adapted to indicate the pressure per square inch on the ram $w$ and the corresponding weight in tons and cwts. on the distant end of the lever $o$.

For the purpose of holding the frame or support up to the rail e there is arranged at each side of the frame or support a clip bar 1 the outer end 2 of which is hooked to engage the lower head or flange of the rail e and the inner end of which is slotted to engage the corresponding arm of a T-shaped tie plate 3 that is drawn inwardly in order to cause the rail e to be firmly gripped between the members a and the hooked ends 2 of the clip bars, by a cotter 4 that extends through slots in the members a and engages the hooked end 5 of the third arm of the tie plate 3.

To ascertain the weight on a locomotive axle for example, the frame or support is placed in position at right angles to the rail e, as shown, with the nose end of the lever o engaging the underside of the projecting portion of the wheel tire r, or any other suitable part of the wheel. The jack, or pressure cylinder w is arranged in the position shown and pressure is applied to the ram u to force the long end of the lever o downwardly and lift the wheel clear of the rail e, the weight on the wheel being registered on the dial of the indicator y.

In order to ascertain the pressure or load on the axle or springs of a locomotive, wagon or other vehicle, a weighing machine or appliance such as described is placed in connection with each wheel of the vehicle.

In details of construction the improved machine or appliance may be otherwise than as shown without departing from the invention.

What I claim is:—

1. In a weighing machine, a support, a lever fulcrumed on said support, a lifting jack pivoted to said support and adapted to bear on one end of said lever, and a pressure indicator connected to said jack.

2. In a weighing machine, a support, a lever fulcrumed on said support, a hydraulic jack pivoted to said support and adapted to bear on one end of said lever, and a pressure indicator connected to said jack.

3. In a weighing machine, a support adapted to abut against the rail of a railway, means adapted to hold said support against said rail, a lever fulcrumed on said support, a lifting jack connected to said support and adapted to bear on one end of said lever, and a pressure indicator connected to said jack.

4. In a weighing machine, a support adapted to abut against the rail of a railway, means adapted to hold said support against said rail, a lever fulcrumed on said support, a hydraulic jack connected to said support and adapted to bear on one end of said lever, and a pressure indicator connected to said jack.

5. In a weighing machine, a support adapted to abut against the rail of a railway, means adapted to hold said support against said rail, a lever fulcrumed on said support, a hydraulic jack pivoted to said support and adapted to bear on one end of said lever, and a pressure indicator connected to said jack.

6. In a weighing machine, a support adapted to abut against the rail of a railway, means adapted to hold said support against said rail, means for adjusting the level of said support, a lever fulcrumed on said support, a lifting jack connected to said support and adapted to bear on one end of said lever and a pressure indicator connected to said jack.

7. In a weighing machine, a support one end of which is adapted to abut against a rail, adjustable feet at the other end of said support, a hydraulic jack cylinder, rods fixed to said cylinder and pivoted to said support, fulcrum blocks on said support, a weighing lever supported on said fulcrum blocks and one end of which is adapted to bear against the bottom of a wheel tire, a ram working in said cylinder adapted to bear on the other end of said lever, and a pressure gage on said cylinder.

8. In a weighing machine, a support one end of which is adapted to abut against a rail, adjustable feet at the other end of said support, a hydraulic jack cylinder, rods fixed to said cylinder and pivoted to said support, fulcrum blocks vertically adjustable on said support, a weighing lever supported on said fulcrum blocks and one end of which is adapted to bear against the bottom of a wheel tire, a ram working in said cylinder adapted to bear on the other end of said lever, and a pressure gage on said cylinder.

9. In a weighing machine, a support one end of which is adapted to abut against a rail, adjustable feet at the other end of said support, a hydraulic jack cylinder, rods fixed to said cylinder and pivoted to said support, fulcrum blocks on said support, a weighing lever supported on said fulcrum blocks and one end of which is adapted to bear against the bottom of a wheel tire, clip bars adapted to engage a rail at each side of said support, a tie plate connected to said clip bars, a cotter extending through said support and engaging said tie plate, a ram working in said cylinder adapted to bear on the other end of said lever, and a pressure gage on said cylinder.

10. In a weighing machine, a support one end of which is adapted to abut against a rail, adjustable feet at the other end of said support, a hydraulic jack cylinder, rods fixed to said cylinder and pivoted to said support, fulcrum blocks vertically adjustable on said support, a weighing lever, supported on said fulcrum blocks and one end of which is adapted to bear against the bottom of a wheel tire, clip bars adapted to engage a rail at each side of said support, a tie plate connected to said clip bars, a cotter extending through said support and engaging said tie plate, a ram working in said cylinder adapted to bear on the other end of said lever, and a pressure gage on said cylinder.

Signed at London England this 21st day of June 1911.

STEPHEN WEST GROOME.

Witnesses:
W. HENRY SIMMS,
H. D. JAMESON.